(12) United States Patent
Woo (10) Patent No.: US 11,330,902 B2
(45) Date of Patent: May 17, 2022

(54) OPENING AND CLOSING TYPE SHELF FIXING CLAMP

(71) Applicant: MSINTECH CO., LTD., Seoul (KR)

(72) Inventor: Cheol Seok Woo, Seoul (KR)

(73) Assignee: MSINTECH CO., LTD., Seoul (KR)

( * ) Notice: Subject to any disclaimer, the term of this patent is extended or adjusted under 35 U.S.C. 154(b) by 30 days.

(21) Appl. No.: 16/604,772

(22) PCT Filed: Mar. 6, 2018

(86) PCT No.: PCT/KR2018/002611
§ 371 (c)(1),
(2) Date: Oct. 11, 2019

(87) PCT Pub. No.: WO2018/190514
PCT Pub. Date: Oct. 18, 2018

(65) Prior Publication Data
US 2020/0121078 A1     Apr. 23, 2020

(30) Foreign Application Priority Data
Apr. 14, 2017   (KR) ........................ 10-2017-0048171

(51) Int. Cl.
*A47B 57/54*     (2006.01)
*A47B 96/02*     (2006.01)
*F16B 2/10*      (2006.01)

(52) U.S. Cl.
CPC ............ *A47B 57/54* (2013.01); *A47B 96/021* (2013.01); *F16B 2/10* (2013.01)

(58) Field of Classification Search
None
See application file for complete search history.

(56) References Cited

U.S. PATENT DOCUMENTS

| | | | |
|---|---|---|---|
| 5,620,210 A | 4/1997 | Eyster et al. | |
| 7,478,971 B2 * | 1/2009 | Li | ........................ A47B 57/545 108/147.13 |
| 8,961,340 B2 * | 2/2015 | Boatwright | ............ A63B 59/50 473/568 |
| 9,192,250 B2 * | 11/2015 | Maurer | ............... A47B 47/0083 |
| 2014/0261107 A1 * | 9/2014 | Sabounjian | .......... A47B 96/024 108/147.13 |

(Continued)

FOREIGN PATENT DOCUMENTS

| | | | | |
|---|---|---|---|---|
| DE | 9114545 U1 * | 2/1992 | ............. | A47B 57/54 |
| KR | 100842217 | 6/2008 | | |

(Continued)

*Primary Examiner* — Steven M Marsh
(74) *Attorney, Agent, or Firm* — Miles & Stockbridge P.C.

(57) ABSTRACT

The present invention relates to an opening and closing type shelf fixing clamp which can easily install and release a shelf, and can be easily and stably coupled to a post. The opening and closing type shelf fixing clamp comprises: a main body (100) which is coupled to a wire (3) constituting two side edges of a shelf (1) and to which a post is coupled; a fixing cover (300) which is coupled to one side of the main body through a hinge and which fixes the post (5) by covering the front surface of the post (5); and a fixing lever (500) which is coupled to the other side of the main body by means of a hinge and which presses the fixing cover toward the main body so as to fix the shelf to the post more stably.

4 Claims, 9 Drawing Sheets

(56) References Cited

U.S. PATENT DOCUMENTS

2019/0183246 A1* 6/2019 Bernic ............... A47B 47/0083

FOREIGN PATENT DOCUMENTS

| KR | 20090007325 U | 7/2009 |
| KR | 20100006691 U | 7/2010 |
| KR | 20110100100 A | 9/2011 |
| KR | 101188727 | 9/2012 |
| KR | 20130005749 U | 10/2013 |
| KR | 200473913 Y1 | 8/2014 |
| KR | 2020090007325 | 7/2019 |

* cited by examiner

OPENING AND CLOSING TYPE SHELF FIXING CLAMP

PRIORITY INFORMATION

The present application is national stage filing under 35 U.S.C. § 371 of PCT/KR2018/002611, filed on Mar. 6, 2018 which claims priority to KR Application No. 10-2017-0048171 filed on Apr. 14, 2017. The applications are incorporated herein by reference in their entirety.

TECHNICAL FIELD

The present invention relates to an opening and closing type shelf fixing clamp for fixing a shelf, and more particularly, to an opening and closing type shelf fixing clamp to easily install and disassemble a shelf and be easily and stably coupled to a post.

BACKGROUND ART

In general, a clamp is used to fix two or three intersecting pipes to each other or fix a shelf or the like to a pipe. The clamp may be classified into a screw type and a lever type according to a scheme of fastening the clamp to the pipe. Typically, the screw type has a strong grip force but an installation is inconvenient. Relatively, the lever type is easily installed but has a weak grip force.

Figure 1:
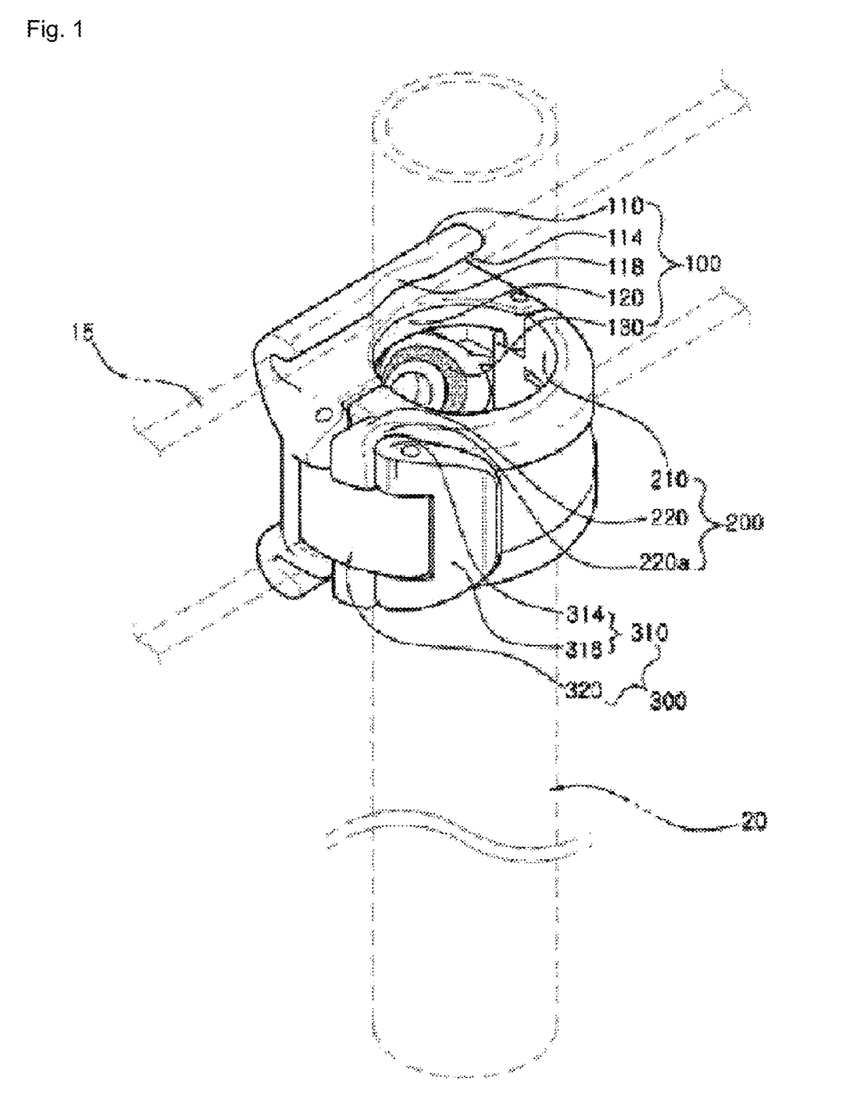
FIG. 1 is a perspective view showing a conventional clamp.
Figure 2:
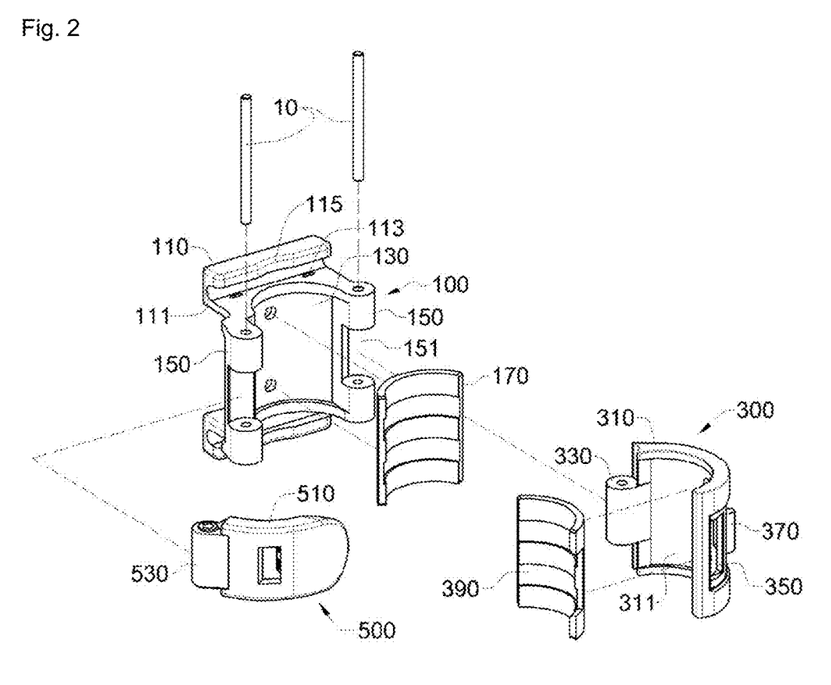
FIGS. 2 and 3 are sectional views showing a shelf fixing clamp according to the present invention.
Figure 3:
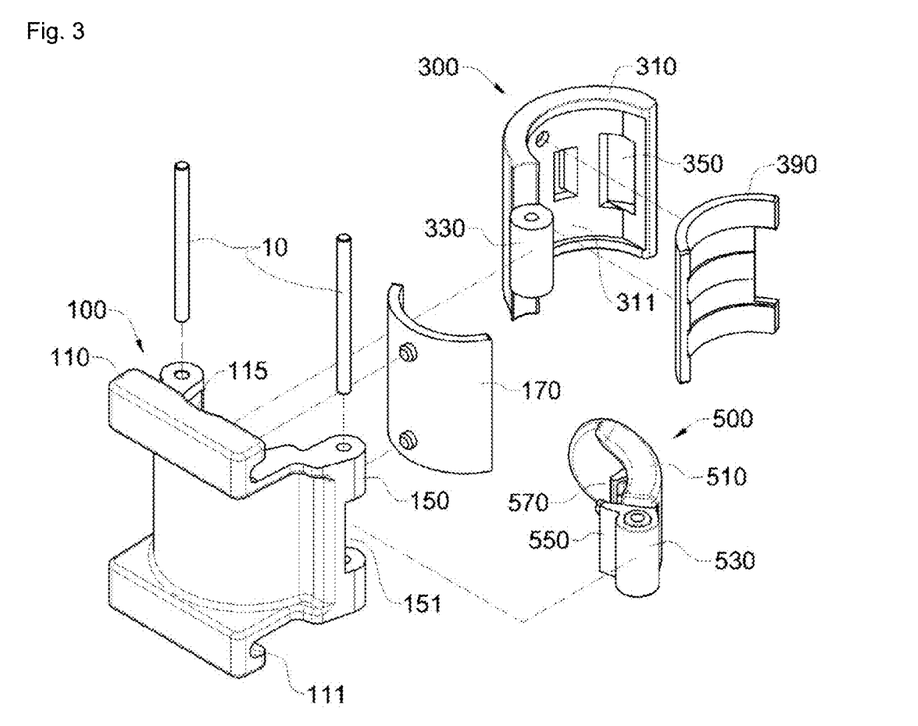
Figure 4:
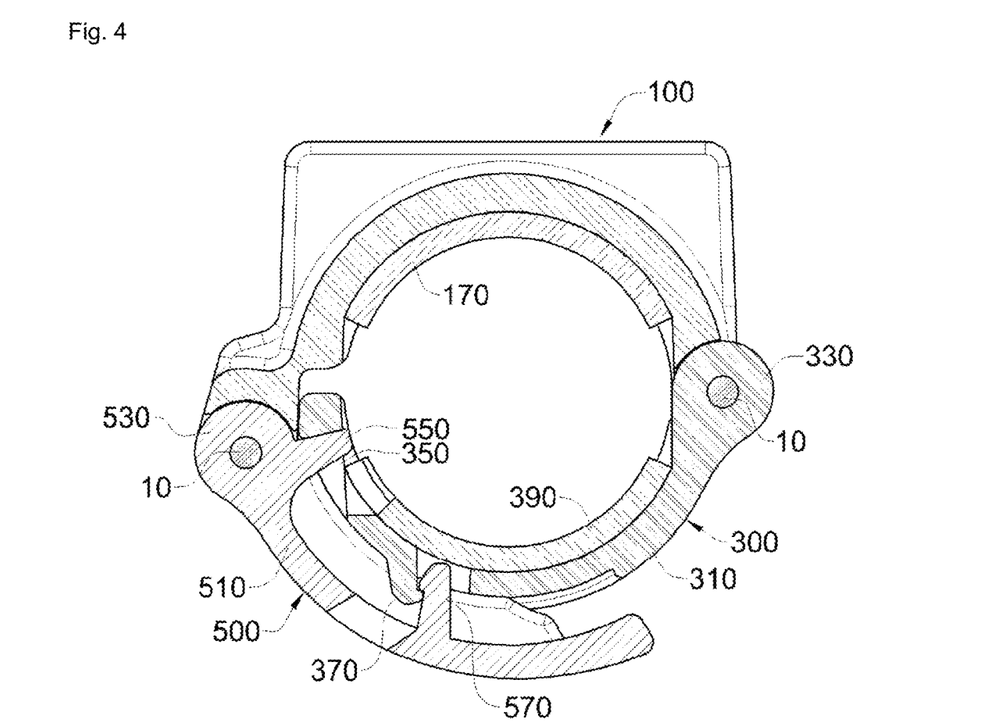
FIGS. 4 to 7 are perspective views showing a fastening process of the shelf fixing clamp according to the present invention.
Figure 5:
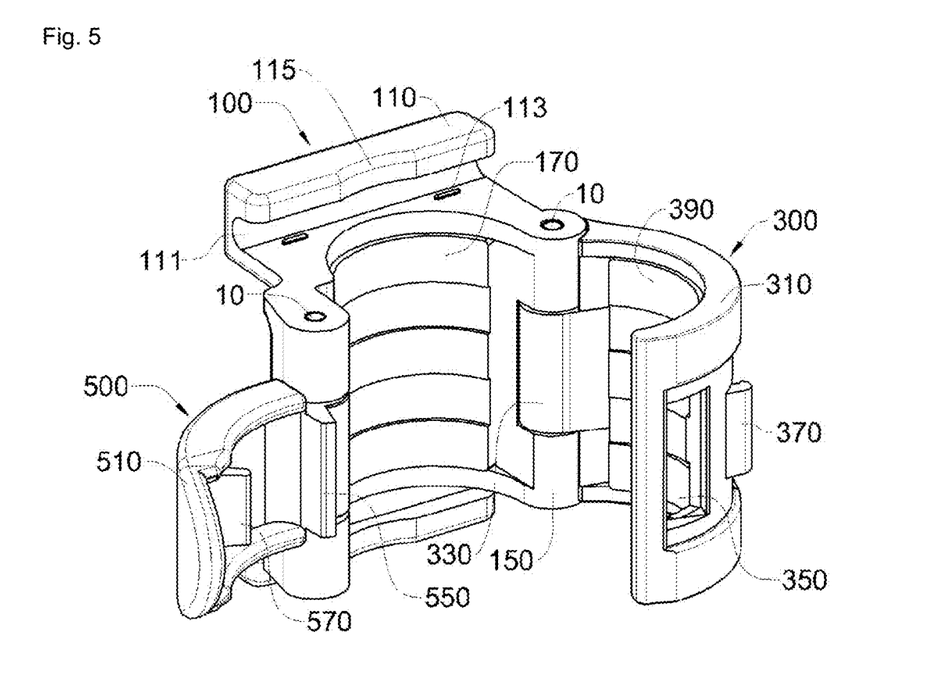
Figure 6:
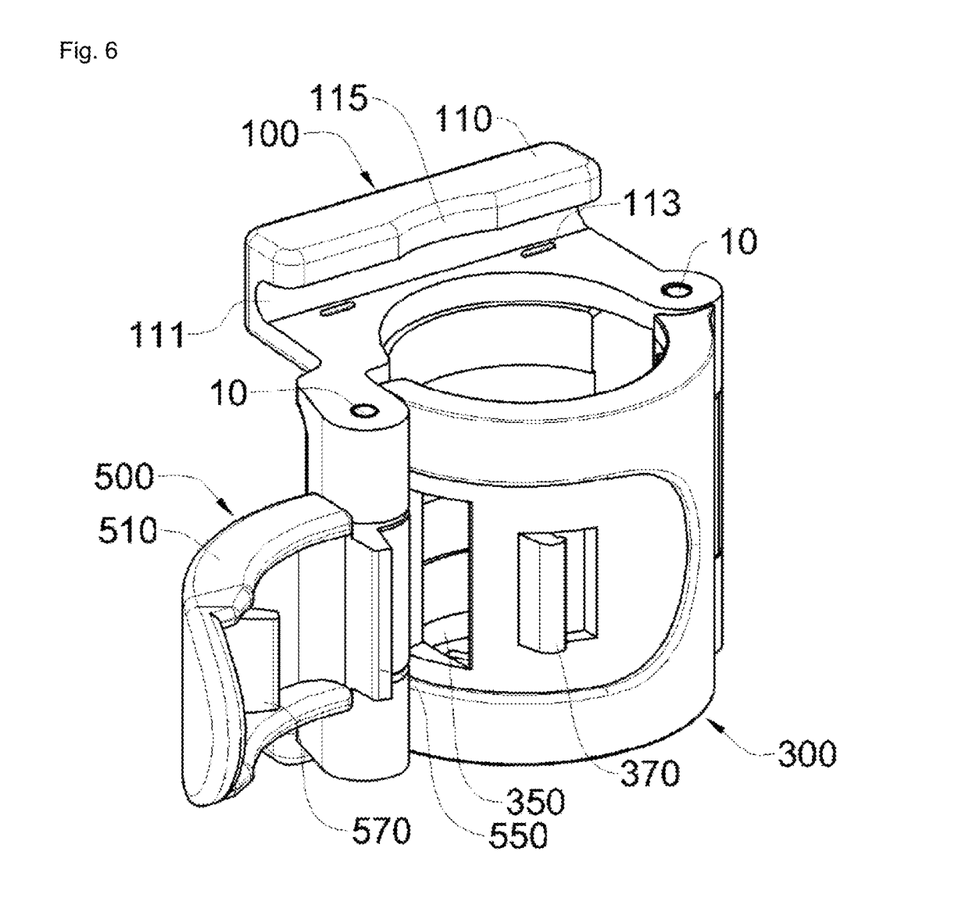
Figure 7:
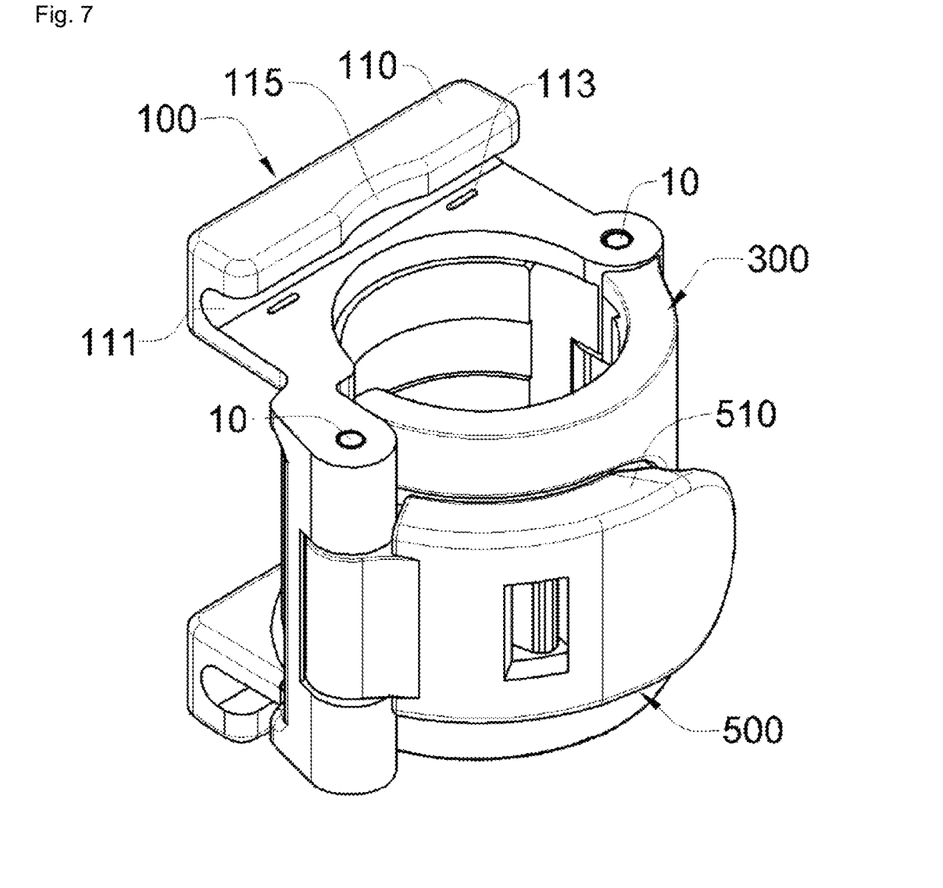
Figure 8:
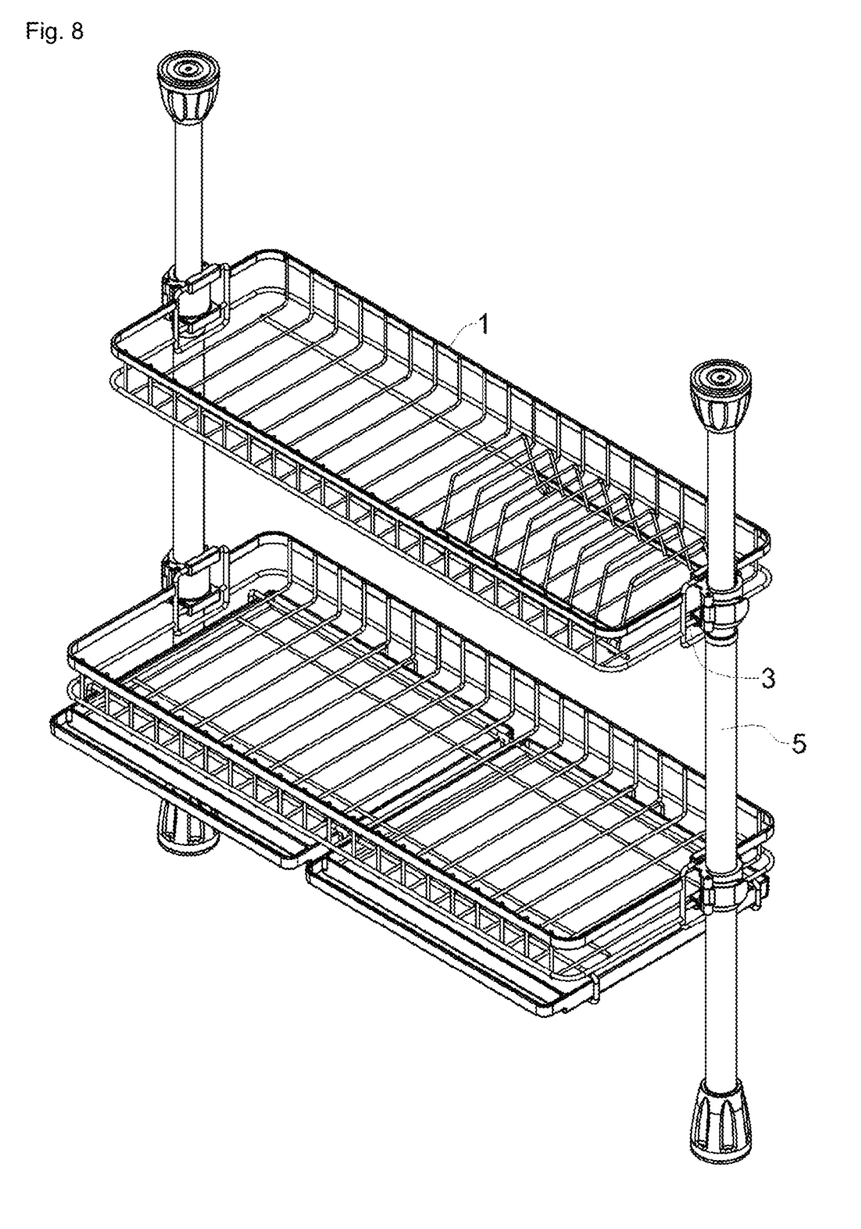
FIGS. 8 to 9 are perspective views showing a state in which the shelf fixing clamp according to the present invention is fastened.
Figure 9:
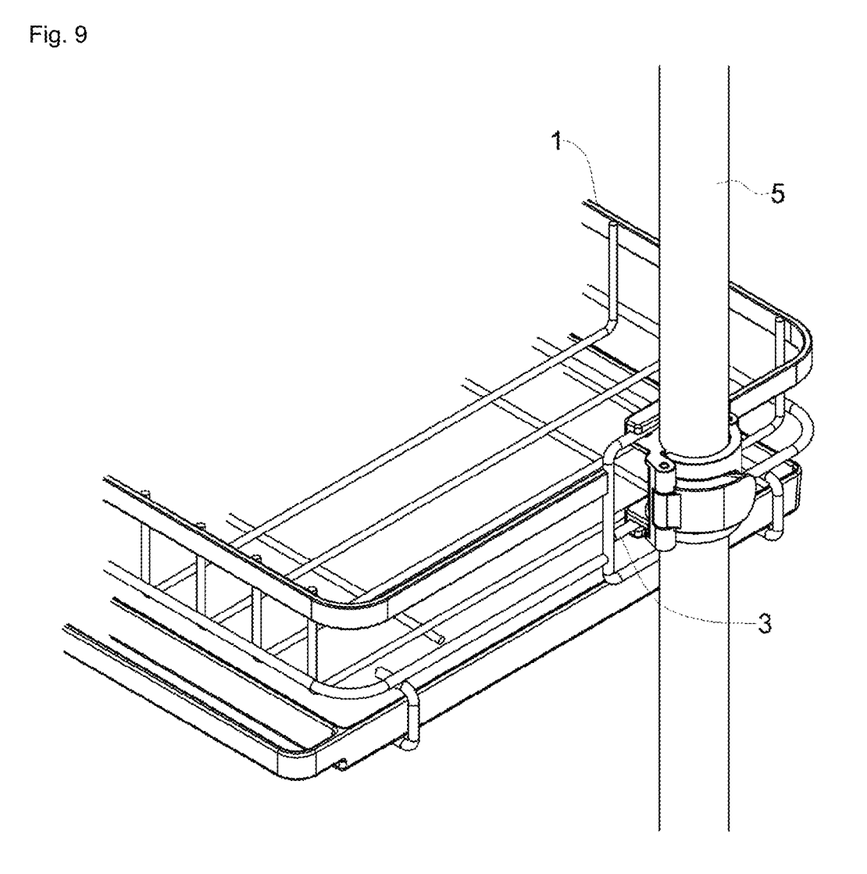

FIG. 1 is an example of a lever type clamp used in the related art, and introduces a shelf fixing device disclosed in Korean Utility Model Publication No. 20-2009-7325.

The shelf fixing device includes: a body portion 100 having a first contact groove 120 formed on an inner side of the body portion to surround a part of an outer side of a support post 20, and having a bent piece 110 formed on an outer side surface of the body portion to fix a shelf frame 15; an opening/closing portion 200, having a second contact groove 210 formed on an inner side of the opening/closing portion to surround a remaining part of the outer side of the support post 20, having a protruding step 220 formed on an outer side of the opening/closing portion, and rotatably coupled to the body portion 100; a fixing portion 300 including a fixing handle 310 into which the protruding step 220 is inserted so as to fix the opening/closing portion 200, and a handle connection portion 320 rotatably coupled to the fixing handle 310 and the body portion 100.

According to a method of installing the above shelf fixing device, the handle connection portion 320 is inserted between the protruding steps 220 and the fixed handle 310 is rotated in a state where the body portion 100 and the opening/closing portion 200 surround an outer circumferential surface of the support post 20, and thus a locking portion 314 of the fixed handle 310 is placed on a recessed portion 220a of the protruding step 220, so that the body portion 100 is firmly fastened to the opening/closing portion 200.

The locking portion 314 has an eccentric structure, and the grip force between the body portion 100 and the opening/closing portion 200 is proportional to an eccentric distance of the locking portion 314.

However, according to the shelf fixing device having the above structure, the fixing handle 310 protrudes from the opening/closing portion 200 to the outside while being installed on the support post 20 as shown in FIG. 1, other objects may be caught in the fixing handle 310 when the shelf fixing device is used, and accordingly the fixing handle 310 is flipped regardless of the user's will, thus there is a high possibility that the body portion 100 and the opening/closing portion 200 are opened to each other.

In addition, since the body portion 100 and the opening/closing portion 200 are supported only by the contact between the locking portion 314 of the fixing handle 310 and the protruding step 220, an overall fastening structure is very weak. Accordingly, when the eccentric distance of the locking portion 314 increases to improve the grip force with respect to the support post 20, a corresponding strong repulsive force is applied between the body portion 100 and the opening/closing portion 200, and thus the fixing handle 310 may be gradually released due to repetitive impacts during uses, and the body portion 100 and the opening/closing portion 200 may be finally opened to each other by themselves.

PRIOR TECHNICAL DOCUMENTS

Patent Document (Patent Document 1) Korean Utility Model Publication No. 20-2009-7325

DETAILED DESCRIPTION OF THE INVENTION

Technical Problem

In order to solve the above problems in the art, an object of the present invention is to provide an opening and closing type shelf fixing clamp to easily install and disassemble a shelf and stably support the shelf to prevent distortion.

In addition, an object of the present invention is to provide an opening and closing type shelf fixing clamp firmly coupled and easily detachable when the shelf fixing clamp is coupled to the post.

In addition, an object of the present invention is to provide an opening and closing type shelf fixing clamp including three fastening portions and two hinges, whereas the conventional clamp includes four fastening portions and three hinges, so that the procedures for production and assembly can be simpler and the attachment and detachment can be easily implemented during use.

Technical Solution

To achieve the above objects, the opening and closing type shelf fixing clamp according to one embodiment of the present invention includes: a main body (100) fastened to wires (3) forming edges of both sides of a shelf (1) and fastened to a post; a fixing cover (300) fastened to one side of the main body through a hinge to surround and fix a front surface of the post (5); and a fixing lever 500 fastened to an opposite side of the main body through a hinge to press the fixing cover toward the main body so as to stably fix the shelf to the post.

The main body (100), which is fastened to the wires (3) forming the edges of the both sides of the shelf (1) and fastened to the post, may include: first fixing blocks (110) formed at upper and lower portions thereof with fitting grooves (111) to which the wires of the shelf are detachably fitted, respectively; a post insertion portion (130) having a semi-circular shape to be forwardly fastened to the post between the first fixing blocks (110); second fixing blocks 150 formed at both ends of the post insertion portion and fastened to the fixing cover 300 and the fixing lever 500 in a hinge manner; and a pad (170) fastened to the post insertion portion of the main body to prevent the shelf from descending on the post.

In addition, a wire fixing protrusion 113 is formed on a front of the fitting groove (111) to prevent the wire from being separated even when the post is not fitted, thereby enabling a user to conveniently adjust a position of the shelf; and the first fixing block 110 is formed at a center thereof with an insertion portion 115 into which a part of the post is inserted to come into tight contact with the wire of the shelf fastened to the fitting groove, thereby preventing the wire from being separated from the fitting groove.

In addition, the fixing cover (300), which is fastened to the one side of the main body (100) through the hinge (10) to surround and fix the front side of the post (5), may include: a body (310) formed therein with a post insertion portion (311) having a semi-circular shape to fasten the post; a fastening block (330) formed at one side of the body, inserted into an insertion portion (151) formed at a center of the fixing block (150) of the main body (100), and rotatably fastened to the main body through the hinge; a tight-contact groove (350) formed at an opposite side of the body, and pulled toward the main body by the fixing lever after a tight-contact protrusion formed in the fixing lever (500) is inserted into the tight-contact groove (350), thereby stably fixing the post; a first double locking protrusion (370) formed at one side of the tight-contact groove, fastened to a second double locking protrusion formed on the fixing lever (500), and pulled toward the main body by the fixing lever to stably fix the post; and a pad (390) fastened to the post insertion portion to prevent the shelf from descending on the post.

In addition, the fixing lever (500), which is fastened to the opposite side of the main body through the hinge to press the fixing cover (300) toward the main body so as to stably fix the shelf (1) to the post (5), the fixing lever (500), which is fastened to the opposite side of the main body through the hinge to press the fixing cover (300) toward the main body so as to stably fix the shelf (1) to the post (5), may include: a fastening block (530) formed at one side of a body (510), inserted into an insertion portion (151) formed at a center of the fixing block (150) of the main body (100), and rotatably fastened to the main body through the hinge; a tight-contact protrusion (550) formed in one side of an insertion groove and inserted into the tight-contact groove (350) formed in the fixing cover (300) to enable the fixing cover to come into tight contact to the main body, thereby stably fixing the post and stably fixing the fixing cover (300) to the main body (100); and a second double locking protrusion (570) formed in the body, fastened to the first double locking protrusion (370) formed in the fixing cover (300), and pulled toward the main body by the fixing lever to stably fix the post and stably fasten the fixing cover (300) to the main body (100) so that the fixing cover is prevented from being easily released by external force, thereby serving as a double locking.

Advantageous Effects of the Invention

According to the opening and closing type shelf fixing clamp of the present invention, the shelf fixing clamp can be easily installed to and disassembled from the post without releasing the installed state of the post.

In addition, according to the present invention, the shelf fixing clamp can be coupled to the post more firmly by the double fixing lever, and easily separated and coupled.

Even though the advantageous effect is not specifically mentioned in the specification of the present invention, a potential effect expected by the technical features of the present invention shall be treated as described in the specification of the present invention.

The accompanying drawings are illustrated as a reference to help understand the technical idea of the present invention, and the scope of claims of the present invention is not limited thereto.

BEST MODE

The terms and words used in the specification and claims of the present invention should not be construed as limited to a conventional or lexical meaning, and should be construed as the meanings and concepts consistent with the technical idea of the present invention based on the principle that "an inventor may define the concept of the term properly in order to describe the invention in the best way".

Further, the embodiments described in the present specification and the configurations shown in the drawings are merely preferred embodiments according to the present invention, and do not represent all of the technical ideas of the present invention. Therefore, it should be understood that various equivalents and modifications may be substituted therefor at the time of filing of the present application.

Detailed descriptions for known functions and configurations that may unnecessarily obscure the essentials of the invention will be omitted.

Hereinafter, the preferred embodiments of the present invention will be described in detail with reference to the accompanying drawings.

The clamp according to the present invention, as shown in accompanying FIGS. 3 to 9, includes: a main body 100 fastened to wires 3 forming edges of both sides of a shelf 1 and fastened to a post; a fixing cover 300 fastened to one side of the main body through a hinge to surround and fix a front surface of the post 5; and a fixing lever 500 fastened to an opposite side of the main body through a hinge to press the fixing cover toward the main body so as to stably fix the shelf to the post.

The main body 100, which is fastened to the wires 3 forming the edges of the both sides of the shelf 1 and fastened to the post, may include: first fixing blocks 110 formed at upper and lower portions thereof with fitting grooves 111 to which the wires of the shelf are detachably fitted, respectively; a post insertion portion 130 having a semi-circular shape to be fastened to the post on a front surface of the main body 100 between the first fixing blocks 110; second fixing blocks 150 formed at both ends of the post insertion portion and fastened to the fixing cover 300 and the fixing lever 500 in a hinge type; and a pad 170 fastened to the post insertion portion of the main body to prevent the shelf from descending on the post The fitting groove may be formed to be coupled to the wire from an inside of the shelf outward, and a wire fixing protrusion 113 may be formed on a front of the fitting groove to prevent the wire from being separated even when the post is not fitted, thereby enabling a user to conveniently adjust a position of the shelf. The first fixing block 110 is formed at a center thereof with an insertion portion 115 into which a part of the post is inserted to come into tight contact with the wire of the shelf fastened to the fitting groove, thereby preventing the wire from being separated from the fitting groove.

In addition, the pad may be fitted and fastened to the post insertion portion by using the first double locking protrusion or by using an adhesive scheme.

The fixing cover 300, which is fastened to the one side of the main body 100 through the hinge 10 to surround and fix the front side of the post 5, may include: a body 310 formed therein with a post insertion portion 311 having a semi-circular shape to fasten the post; a fastening block 330 formed at one side of the body, inserted into an insertion portion 151 formed at a center of the fixing block 150 of the main body 100, and rotatably fastened to the main body through the hinge; a tight-contact groove 350 formed at an opposite side of the body, and pulled toward the main body by the fixing lever after a tight-contact protrusion formed in the fixing lever 500 is inserted into the tight-contact groove 350, thereby stably fixing the post; a first double locking protrusion 370 formed at one side of the tight-contact groove, fastened to a second double locking protrusion formed on the fixing lever 500, and pulled toward the main body by the fixing lever to stably fix the post; and a pad 390 fastened to the post insertion portion to prevent the shelf from descending on the post.

The fixing lever 500, which is fastened to the opposite side of the main body through the hinge and presses the fixing cover 300 toward the main body to stably fix the shelf 1 to the post 5, the fixing lever 500, which is fastened to the opposite side of the main body through the hinge and presses the fixing cover 300 toward the main body to stably fix the shelf 1 to the post 5, may include: a fastening block 530 formed at one side of a body 510, inserted into an insertion portion 151 formed at a center of the fixing block 150 of the main body 100, and rotatably fastened to the main body through the hinge; a tight-contact protrusion 550 formed in one side of an insertion groove and inserted into the tight-contact groove 350 formed in the fixing cover 300 to enable the fixing cover to come into tight contact to the main body, thereby stably fixing the post and stably fixing the fixing cover 300 to the main body 100; and a second double locking protrusion 570 formed in the body, fastened to the first double locking protrusion 370 formed in the fixing cover 300, and pulled toward the main body by the fixing lever to stably fix the post and stably fasten the fixing cover 300 to the main body 100 so that the fixing cover is prevented from being released by external force, thereby serving as a double locking.

It shall be apparent to those skilled in the art that the present invention described above is not limited to the above-described embodiments and the accompanying drawings, and various replacements, deformations and modifications are available without departing from the technical idea or scope of the invention.

DESCRIPTION OF REFERENCE NUMERALS

100: main body
110: first fixing block
111: fitting groove
113: wire fixing protrusion
115: post insertion portion
130: post insertion portion
150: second fixing block
150: insertion portion
170: pad
300: fixing cover
310: body
311: post insertion portion
330: fastening block
350: tight-contact groove
370: first double locking protrusion
500: fixing lever
510: body
530: fastening block
550: tight-contact protrusion
570: second double locking protrusion

The invention claimed is:

1. An opening and closing type shelf fixing clamp comprising:
a main body (100) fastened to wires (3) forming both side edges of a shelf (1) and to which a post is fastened;
a fixing cover (300) fastened to one side of the main body through a hinge to surround and fix a front surface of the post (5); and
a fixing lever (500) fastened to an opposite side of the main body through a hinge to press the fixing cover toward the main body so as to stably fix the shelf to the post,
wherein the main body (100), which is fastened to the wires (3) forming the both side edges of the shelf (1) and to which the post is fastened, includes:
first fixing blocks (110) formed at upper and lower portions thereof with fitting grooves (111) to which the wires of the shelf are detachably fitted, respectively;
a post insertion portion (130), which has a semi-circular shape such that the post is fastened to the post insertion portion (130) between the first fixing blocks (110) from a front of the post insertion portion (130);
second fixing blocks (150) formed at both ends of the post insertion portion and fastened to the fixing cover (300) and the fixing lever (500) in a hinge type; and
a pad (170) fastened to the post insertion portion of the main body to prevent the shelf from descending on the post.

2. The opening and closing type shelf fixing clamp of claim 1,
wherein the fitting groove (111) is formed on a front thereof with a wire fixing protrusion (113) to prevent the wire from being separated even when the post is not fitted, thereby enabling a user to conveniently adjust a position of the shelf; and the first fixing block (110) is formed at a center thereof with an insertion portion (115) into which a part of the post is inserted to come into tight contact with the wire of the shelf fastened to the fitting groove, thereby preventing the wire from being separated from the fitting groove.

3. The opening and closing type shelf fixing clamp of claim 1,
wherein the fixing cover (300), which is fastened to the one side of the main body (100) through the hinge (10) to surround and fix the front side of the post (5), includes:
a body (310) formed therein with a post insertion portion (311) having a semi-circular shape to fasten the post;
a fastening block (330) formed at one side of the body, inserted into an insertion portion (151) formed at a center of the fixing block (150) of the main body (100), and rotatably fastened to the main body through the hinge;

a tight-contact groove (350) formed at an opposite side of the body, and pulled toward the main body by the fixing lever after a tight-contact protrusion formed in the fixing lever (500) is inserted into the tight-contact groove (350), thereby stably fixing the post;

a first double locking protrusion (370) formed at one side of the tight-contact groove, fastened to a second double locking protrusion formed on the fixing lever (500), and pulled toward the main body by the fixing lever to stably fix the post; and a pad (390) fastened to the post insertion portion to prevent the shelf from descending on the post.

4. The opening and closing type shelf fixing clamp of claim 1, wherein the fixing lever (500), which is fastened to the opposite side of the main body through the hinge and presses the fixing cover (300) toward the main body to stably fix the shelf (1) to the post (5), includes:

a fastening block (530) formed at one side of a body (510), inserted into an insertion portion (151) formed at a center of the fixing block (150) of the main body (100), and rotatably fastened to the main body through the hinge;

a tight-contact protrusion (550) formed in one side of an insertion groove and inserted into the tight-contact groove (350) formed in the fixing cover (300) to enable the fixing cover to come into tight contact to the main body, thereby stably fixing the post and stably fixing the fixing cover (300) to the main body (100); and a second double locking protrusion (570) formed in the body, fastened to a first double locking protrusion (370) formed in the fixing cover (300), and pulled toward the main body by the fixing lever to stably fix the post and stably fasten the fixing cover (300) to the main body (100) so that the fixing cover is prevented from being easily released by external force, thereby serving as a double locking.

\* \* \* \* \*